Sept. 14, 1954      S. C. PECKETT      2,688,826
METHOD AND MEANS FOR PREPARING TRUE SURFACES
Filed March 17, 1952      3 Sheets—Sheet 1
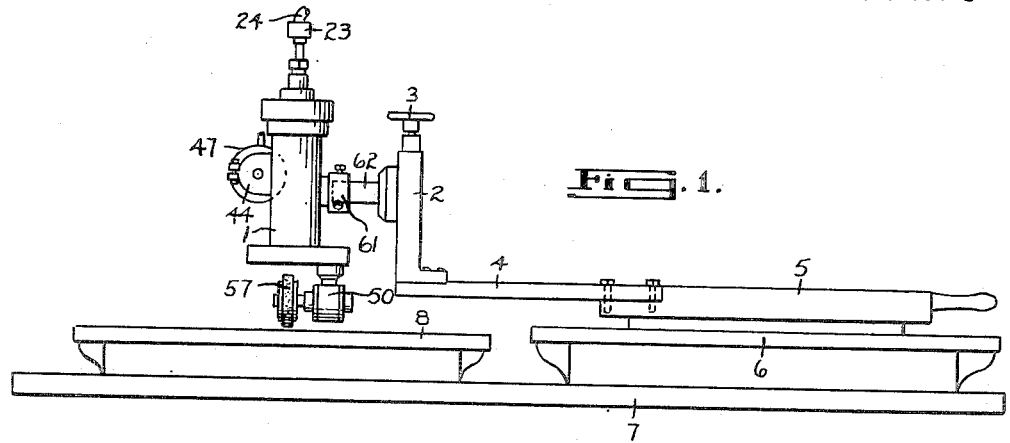
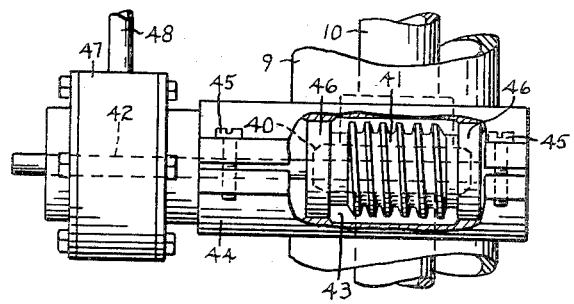
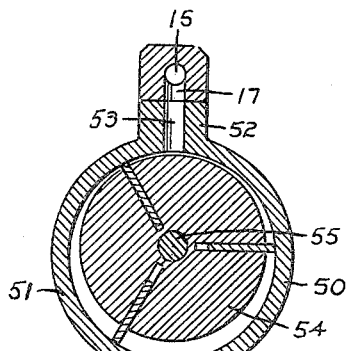
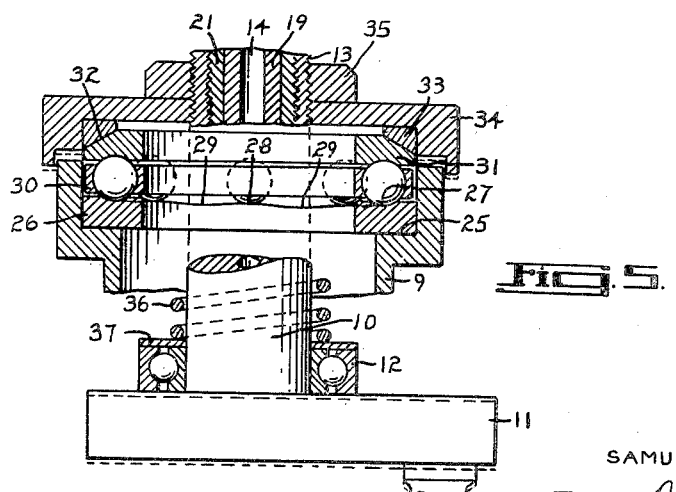
INVENTOR
SAMUEL CHARLES PECKETT
*Douglas S. Johnson*
ATTY.

UNITED STATES PATENT OFFICE 2,688,826

METHOD AND MEANS FOR PREPARING TRUE SURFACES

Samuel Charles Peckett, Toronto, Ontario, Canada

Application March 17, 1952, Serial No. 276,972

17 Claims. (Cl. 51—90)

This invention relates to improvements in the art of surfacing metal and more particularly to the preparing of true surfaces, such as for instance the surfaces of plain or angled members such as surface plates, angles, parallels, the base plates and ways of a machine or any other object which requires a highly accurate surface.

In the preparation of true surfaces the surface must be perfectly accurate but must not be dead smooth otherwise suction will prevent other surfaces from moving easily over the true surface. In consequence it is known in the art to be highly desirable to finely scrape or score the surface while leaving the accuracy unimpaired.

While different automatic scraping apparatus have been evolved industry has not found these completely satisfactory and where optimum results are required almost invariably resort is made to the old laborious time-consuming hand scraping.

There are many problems in the surfacing with mechanical apparatus; the accuracy of the surface is usually spoilt by deformation under the heat and/or pressure of the grinding apparatus; the surface is liable to be damaged by cutting too deeply with a positively driven grinder and the surfaces of angled members and small area surfaces are almost inaccessible to the grinding elements.

Further, in addition to a lack of complete accuracy, the desirability and uniformity of appearance of the finished surfaces ground with mechanical apparatus has heretofore fallen short of the old hand scraped surface. The problem of providing accurate surfaces with grinding apparatus is steadily becoming more acute as relatively few skilled and experienced men capable of fine work are available and their number is steadily decreasing.

While the apparatus described in my United States Patent 2,450,157, September 28, 1948, has afforded a means of improving machine-ground surfaces, it is the object of the present invention to provide a method and an improved and simplified means which will render machine-ground true surfaces still more superior to those presently obtainable. More particularly the principal object of the invention is to produce accurate surfaces which will be markedly superior to the finest hand scraped surfaces for accuracy, uniformity and appearance, providing a particularly desirable surface pattern.

A further important object is to enable such surfaces to be relatively easily and quickly prepared at a great saving in costs by relatively inexperienced workmen.

Still a further object is to enable a surface to be produced, which surface will be more accurate than the surface from which it is produced.

Still a further object is to simplify the means of carrying out the surfacing and to provide means which, even in the hands of relatively inexperienced workmen, will eliminate the problem of distorting the surface due to heat or pressure or gouging the surface due to inadvertent contact by the grinding element.

Again another object is to provide a grinding apparatus which will suffer relatively little wear and provide long-life operation.

The principal feature of the invention consists in forming a true surface by grinding the surface by means of intermittent, non-continuous cuts of a grinding element while continuously changing the direction of cut as the grinding proceeds and as the surface and grinding element are moved relative each other to provide a highly desirable criss-crossing overlapping pattern of surface cuts presenting a multiplicity of minute high spots forming the "surface" surrounded by shallow depressions which break up the surface from "dead" smooth.

It is particularly important that the duration of each cut be sufficiently short so that there will not be any appreciable rise in temperature to distort the surface as in the prior art surface grinding, and that the cutting effort be restricted to limit the depth to which the cutting element will cut to prevent gouging.

In carrying out the method grinding proceeds from high area to high area on the surface until the high spots are reduced to the general level of the surface and the whole completely surfaced to provide a myriad of interlacing criss-crossing score or surface cut patterns.

As a preferred means to carry the above-mentioned grinding operation into effect the invention contemplates a new improved and simplified form of grinding apparatus in which a grinding element is caused to rotate about an axis parallel the surface to be trued, while simultaneously being revolved about an axis perpendicular the surface to progressively alter the direction of cut of the element as it is rotated.

A further important feature resides in imparting a reciprocating motion to the grinding element in a direction perpendicular the surface as it is rotated about the mutually perpendicular axes to provide a variation in the cut depth.

Still a further feature resides in driving the grinding element through the elastic medium of an air drive serving both to cool the grinding element and to enable the grinding element to stop upon being positioned to cut too deeply to prevent gouging of the surface.

These and other objects and features will become apparent upon reference to the following detailed description taken in conjunction with the accompanying drawings in which Figure 1 is an elevational view of a surface grinder constructed in accordance with this invention and forming the preferred means of carrying out a surface grinding according to the invention.

Figure 3 is a side elevational detail on an enlarged scale partly broken away of the worm drive for operating the cutting head.

Figure 4 is a vertical sectional detail on the line 4—4 of Figure 2.

Figure 5 is an enlarged fragmentary mid-vertical sectional detail illustrating the means for vibrating the cutting head perpendicular to the surface to be trued.

Figure 2:
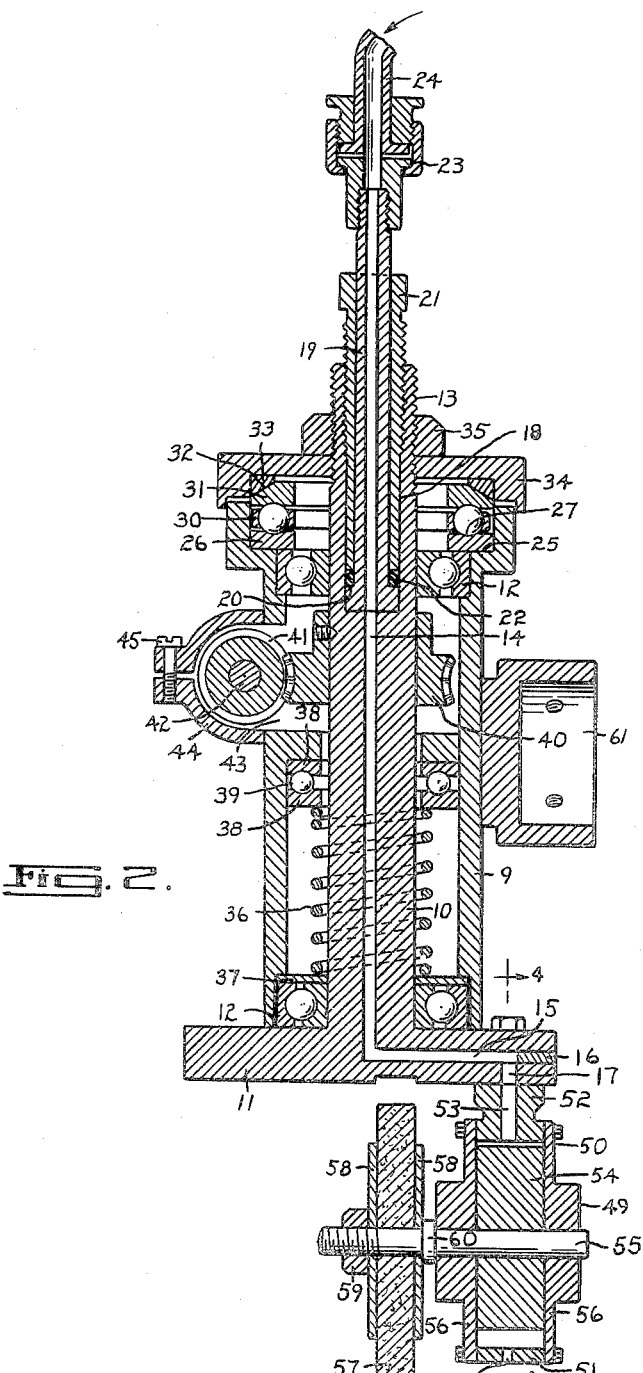
Figure 2 is an enlarged mid-vertical sectional detail of the grinding unit of the apparatus of Figure 1.

The preferred and simplest form of apparatus for carrying out the invention is illustrated in Figure 1. The grinding unit of this apparatus generally designated at 1 is shown supported from a vertical bracket 2 for vertical adjustment by operation of the hand wheel 3, the vertical bracket being carried at the outer end of an arm 4 carried by an inverted "true" surface plate 5 which moves on a surface plate 6 supported on a base plate 7, which also supports the surface 8 to be trued.

In place of and corresponding to the "true surface" 5 the grinding unit may of course be mounted on the carriage of a grinding machine which runs on the machine ways which correspond to the surface plate 6 with the bed of the machine corresponding to the base plate 7.

The grinding unit 1 comprises a cylindrical casing 9 within which is journalled a vertical shaft 10 terminating at the lower end in an enlarged flange 11. This shaft 10 rotates in the roller bearings 12 and is formed with a threaded upper end 13 and with a central bore 14 which has a lateral extension 15 extending radially of the flange 11, the end of the bore extension being sealed with the plug 16, and an orifice 17 provides an outlet to the lower face of the flange. At the upper end the shaft is also provided with an enlarged counterbore 18 in which seats an inner tube 19 formed with an enlarged lower end defining a shoulder 20.

The interior of the counterbore 18 is also threaded to be engaged by a sleeve 21 mounted on the tube 19 and compressing a resilient annular packing or washer 22 against the shoulder 20 to form an effective air seal. The tube 19 is connected to a compressed air source through a suitable coupling 23 connecting the tube to a flexible air line 24. At the upper end the casing 9 is enlarged to define an annular seat 25 on which is supported a ring 26, seen particularly in Figure 5, which is formed with a groove 27 having a varying surface contour alternating between peaks and depressions 28 and 29 respectively. Rolling in this groove 27 are the balls of the ball race 30, and overlying the ball race 30 is a grooved ring 31 formed with a chamfered peripheral edge 32 engaged by correspondingly chamfered ring 33 received beneath a cap 34 that is held in position by a nut 35.

Urging the shaft 10 downwardly is a heavy coil spring 36 held in compression between a bearing ring 37 and the lower of rings 38 of a ball race 39. The action of this spring is to hold the cap 34 downwardly to force the balls of the ball race 30 to ride on the bearing surface of the groove 27. The result is that upon turning the shaft 10 a longitudinal reciprocating motion will be imparted thereto as the balls roll over the peaks 28 and into the depressions 29.

The height of the peaks 28 measured from the bottoms of the depressions 29 will of course be extremely small, of the order of .1 to .4 thousandth of an inch.

The use of the chamfered rings 32 and 33 provides a centering action to ensure that the assembly is correctly centered and the balls of the ball race 30 are accurately registered with the groove 27.

Rotation is imparted to the shaft 10 through a worm gear 40 driven by a worm 41 mounted on a shaft 42 extending right angularly to the shaft 10. The casing 9 is formed with an opening 43 through which the worm 41 projects to engage the worm gear 40. A split semi-cylindrical horizontal casing 44 encloses the worm and it is drawn into closed position by the bolts 45. The worm shaft 42 is journalled in a pair of lugs 46 between which the worm 41 is arranged to prevent axial movement thereof, and these lugs 46 may be formed integral with the casing 9.

The drive to the shaft 42 by a small compressed air motor 47 is connected to the compressed air source through an air pipe 48. The motor 47 is of the type disclosed in the above-mentioned patent and is similar in construction to the motor employed in driving the grinding element, as hereinafter explained.

The cutting head of the unit 1 is generally designated at 49; this comprises a compressed air motor 50 secured to the underside of the flange 11 of shaft 10 and comprising a cylindrical casing 51 having a vertical projection 52 formed with a bore 53 registering with the orifice 17 communicating with the air passages or bores 14 and 15 in the shaft 10.

Arranged within the casing 51 is a radial vane rotor 54 mounted eccentrically on a shaft 55 journalled horizontally in bearings in end plates 56 closing the ends of the casing 51. Mounted on the shaft 55 substantially in alignment with the axis of the main shaft 10 is a grinding wheel or element 57 locating a pair of flanges 58 and gripped thereby under the locking action of a nut 59, forcing the assembly against a shoulder 60.

The casing 9 is formed with a laterally projecting sleeve extension 61 which permits the casing to be clamped to an arm 62 carried by the vertical bracket 2 or to any other object or structure, such as the carriage of a grinding machine which is to be used as a reference from which the apparatus is to operate.

From Figure 1 it will be seen that the utilization of the shaft 10 as the air passage and the provision of the air seal at 22 and the air connection through the orifice 17 in the flange 11 to the motor 59 provides a particularly advantageous means of supplying the compressed air to the motor, enabling an extremely compact unit to be provided. Moreover, this arrangement facilitates connection to the air supply at 24 in axial alignment with the shaft 10.

The arrangement of the single cutting wheel 57 to incorporate the various phases of motion enables this single wheel to operate over small areas and angled surfaces which would be inaccessible to the more complex apparatus of the prior art.

In operation it will be seen that the grinding wheel 57 has a peculiar composite motion. It is rotated about the axis of the shaft 55, which axis is parallel the surface 8 to be trued. Also the whole cutting head, including the grinding wheel 57, is simultaneously bodily revolved about the axis of the main shaft 10 which is perpendicular to the surface 8. Simultaneously the cutting head 49 and shaft 10 are vertically rericiprocated by means of the ball race 30 operating over the contoured surface of the groove 27.

Figure 6:
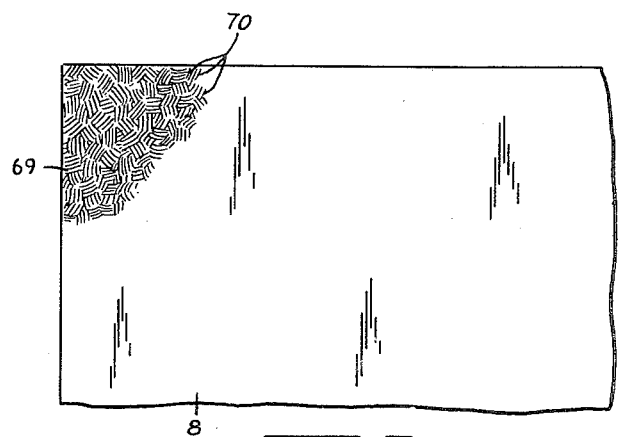
Figure 6 is a diagrammatic plan view of the surface being trued showing the surface pattern produced by grinding in accordance with the present method.
Figures 7, 7A:
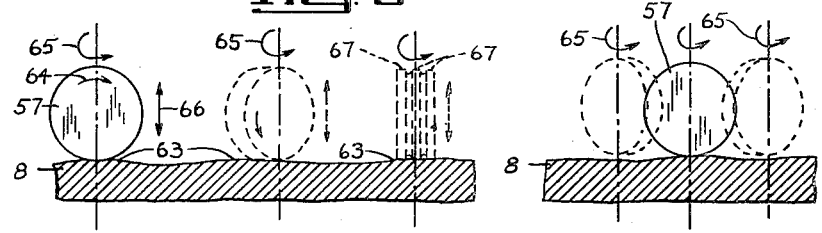
Figure 7 is a diagrammatic vertical sectional view illustrating the grinding in process, the high spots being very much over-emphasized for the sake of illustration.
Figure 7A is a diagrammatic view similar to Figure 7 but showing the vertical motion of the grinding element as it goes into and out of its cut.

Referring to Figures 6 to 9, the surfacing operation will be more fully appreciated. As illustrated in Figure 7, the surface 8, representing the surface to be trued, will have high spots 63 shown in very much exaggerated form in Figures 7 and 7A. The cutting element 57 with its composite motion is then caused to move over this surface, grinding the high spots to reduce them to the general level of the surface.

As will be seen, the grinding element 57 is rotating in the direction of the arrow 64 while it is simultaneously rotating about a vertical axis in the direction of the arrow 65 and vertically reciprocating as illustrated by the arrow 66.

The dotted line positions of the abrading or cutting element 57 shown in Figure 7 illustrate the turning motion about the axis normal the surface 8. It will be noted that in Figure 7 the cutting wheel 57 is shown as grooved to provide the spaced cutting peripheral portion 67.

Figure 7A illustrates the vertical motion of the cutting wheel as it moves downwardly into cutting contact and then moves upwardly under the vertical reciprocation. The feature of this motion is that the cutting is not continuous but is intermittent, moving downwardly and cutting for an instant and then moving upwardly. The duration of the cut, that is, the speed of reciprocation may be varied throughout a wide range provided that the cutting element 57 is not maintained in cutting contact for a period sufficient to appreciably raise the temperature of the surface 8 to thereby distort the surface.

In ordinary grinding apparatus, due to the heat of grinding, the surface distorts and metal is taken off at the wrong spot and when the metal cools it warps away from the "true" surface which the grinding appeared to have established.

In the present instance while the cutting element is in abrading contact with the surface, and also during the period it is moving into and out of engagement with the surface, a cooling exhaust of compressed air is delivered through the discharge opening 68 (Figure 2) onto the surface to assist in maintaining the surface at a substantially uniform temperature as grinding proceeds.

Figure 8:
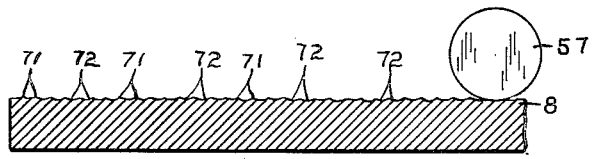
Figure 8 is a view similar to Figure 7 but showing the surfacing substantially completed.

Figure 8 illustrates the surfaces of Figures 7 and 7A, with the high spots 63 reduced to the general level of the surface and the entire surface "finished" by a fine grinding of the cutting element 57. As the cutting element is continually changing its direction of cut, as indicated by the movement depicted by the arrows 65, a mosaic pattern of criss-crossing overlapping cuts is formed, as illustrated at 69 in Figure 6. These cuts present almost microscopic tailing score lines 70, and, as illustrated in Figure 8, form a series of peaks 71 surrounded by shallow depressions 72. The peaks 71 form the "surface"; the surrounding depressions or concavities formed break up the surface without spoiling the dead accuracy of the surface as formed by the peaks or high spots 71 while eliminating the problems incident to presenting a surface dead smooth.

Figure 9:
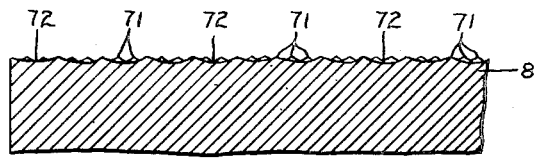
Figure 9 is a very much enlarged vertical sectional detail illustrating the myriad of high spots and shallow depressions in the surface provided in accordance with the invention.

Figure 9 illustrates in an enlarged form the high spots 71 and surrounding depressions which go to form the pattern 69, Figure 6. Each time the cutting element 57 makes an overlapping cut in a different direction a series of these high spots will be formed.

The quality of the work is actually measured by the number of these high spots per square inch together with their uniformity in level throughout the surface. By providing a plurality of grooves in the cutting element 57 to provide a plurality of cutting platforms 67 the number of high spots and hence the quality of the work, according to machine shop practice, is increased.

The other factor besides heat which distorts the surface when being ground is excessive pressure of the cutting element. In the present instance by using the air drive if the resistance to the cut is increased beyond a certain point as the cutting element contacts the surface the elastic medium of the drive will permit the element to stop. Thus the cutting element will be precluded from either gouging the surface or distorting it under pressure.

Moreover, since the cutting element is in only intermittent momentary contact with the surface 8 and then contacting in a different direction with each cut, there will be no sustained frictional force acting to displace the surface 8 as is the case where, for instance, the cutting element is carried by the carriage of a grinding machine and moved across the surface 8.

The result is that no clamping pressure which would distort the surface is required to hold the surface in place, an important advantage over the prior art surface grinding where the pressure required to hold the surface against displacement to a greater or lesser degree set up stresses to deform the surface which would recover on release to spoil the surface accuracy.

While Figure 1 illustrates a manner in which the grinding unit, which is the preferred apparatus for providing the improved surface in accordance with the invention, may be supported over the surface 8 to be trued, the grinding unit may also be supported from the carriage on the ways of a grinding machine and caused to move back and forth past the surface 8. Alternatively of course the grinding unit may be held stationary and the surface 8 caused to move back and forth beneath its cutting element 57.

Further, while the preferred form of bringing the cutting element into and out of the surface 8 is through vertical reciprocation as illustrated, the cutting element may be caused to cut and then withdraw in other modes of motion according to the invention provided the length of cutting time, that is, the time during which the cutting element is in contact with the surface 8 is maintained sufficiently short to prevent heating and hence distortion of the surface. This time will of course vary according to the thickness of the article being trued, the dissipation surface area and the heat conductivity.

With the apparatus illustrated in Figure 1 the plate 5 is moved to grind the high spots on the surface 8 and grinding proceeds, moving from high spot to high spot until the whole surface 8 will be reduced to the desired accurate level.

It is possible to produce a surface 8 of greater accuracy than the surface from which the plate 5 works as the surface 5 will bridge any concavities in the surface 6 on which it is working so that they will not be reproduced in the surface 8 being trued.

By grinding with the short intermittent cuts and by continually changing the direction of cut the surfacing can be carried out with the highest degree of accuracy on large surfaces to provide a surface pattern of a complexity and uniformity much superior to the finest hand scraping work. It will be appreciated that such machine finishing can be accomplished in a small fraction of the time required for accurate hand scraped work and the problems of distortion due to a machining have been eliminated.

While Figure 5 shows the bottom ring 26 as formed with the contoured groove 27, the same result may be obtained by incorporating the contoured groove in the upper ring 31. Also it will be appreciated that while the ball and groove arrangement is preferable, vertical vibration may be imparted by other means for instance making the cutting wheel off balance or placing an unbalancing mass on the shafts 55 or 42.

What I claim as my invention is:

1. A method of forming true surfaces comprising, grinding a surface to be trued by cutting the surface with an interrupted cutting action to maintain the surface free of significant heat distortion while continuously changing the direction of the cut at a constant uniform rate to reduce the surface to an accurate level while presenting a surface pattern of criss-crossing overlapping surface cuts defining a multiple of high spots constituting the true surface and separated by valleys between said spots.

2. A method of forming true surfaces comprising, grinding a surface to be trued by abrading the surface with a series of short cutting bursts while continually changing the direction of cut at a constant uniform rate and while the abraiding is actually in progress to reduce the surface to an accurate level while presenting a surface pattern of criss-crossing overlapping surface cuts defining a multiple of high spots constituting the true surface and separated by valleys between said spots, each cutting burst being limited in duration to maintain said surface free of heat distortion.

3. A method of forming true surfaces comprising, abraiding the surface to reduce the surface to an accurate level with an interrupted cutting action providing a series of successive cuts in which the duration of the cuts and the interval between cuts is regulated to maintain the surface at substantially ambient temperatures and free from heat distortion, and continually and uniformly changing the direction of cutting as said interrupted cutting action proceeds.

4. A method of forming true surfaces comprising, abrading the surface to reduce high areas on the surface to the general level of the surface and subsequently scoring the surface to provide a uniform pattern of criss-crossing overlapping cuts presenting substantially uniformly throughout said surface a multiple of high spots of uniform level to constitute the true surface, with said high spots being separated by valleys, said abrading being performed by a discontinuous cutting action comprising a series of spaced short cuts, with the cuts being made in a continuously and uniformly changing direction and the duration of the cuts and the interval between cuts being regulated to maintain the surface at substantially ambient temperature and free from heat distortion.

5. A method of forming true surfaces comprising grinding the surface with an interrupted cutting action in which a cutting element is moved into and out of cutting contact with the surface to perform a series of cuts, the direction of cutting being altered continuously while cutting is in progress, the duration of said cuts and the interval therebetween being so timed as to maintain the surface at substantially ambient temperature and free from heat distortion, said grinding proceeding from high spot to high spot on said surface to reduce said surface to a general level and back and forth over said surface to provide a pattern of criss-crossing overlapping surface cuts.

6. In a surfacing apparatus, an abrading wheel, means supporting said abrading wheel to rotate about an axis parallel the surface to be trued with the plane of said wheel perpendicular to said surface, means supporting said latter wheel supporting means for rotation about an axis perpendicular said surface, means imparting uniform vibration to said wheel perpendicular to said surface to carry said wheel into and out of contact with said surface, means for rotating said wheel about said axis parallel said surface, and means to rotate said wheel-supporting means about said axis perpendicular to said surface.

7. In a surfacing apparatus, an abrading wheel mounted with its plane perpendicular to a surface to be trued to rotate on an axis parallel to the surface and to revolve on an axis perpendicular said surface, and means imparting vibration to said grinding wheel in a direction perpendicular to said surface to carry said wheel into and out of contact with said surface.

8. In a surfacing apparatus, an abrading wheel mounted with its plane perpendicular to a surface to be trued to rotate on an axis parallel to the surface and to revolve about an axis perpendicular said surface, an air drive rotating said driving wheel about said horizontal axis, means driving said wheel to revolve about said axis perpendicular said surface, and means operated by the revolution of said wheel about said axis perpendicular to said surface imparting vibration to said wheel in a direction perpendicular to said surface to carry said wheel into and out of contact with said surface.

9. A cutting unit for truing surfaces comprising a casing adapted to be mounted perpendicular a surface to be trued, a main shaft journalled in said casing to rotate about an axis perpendicular said surface and mounted for reciprocal movement perpendicular said surface, means rotating said main shaft, means operated by the rotation of said main shaft reciprocating said main shaft and a cutting head secured to said shaft, said cutting head comprising an air motor, a head shaft journalled to rotate about an axis perpendicular the axis of said main shaft, and a grinding wheel mounted on said head shaft.

10. A cutting unit for truing surfaces comprising a casing, a main shaft journalled in said casing to rotate about an axis perpendicular a surface to be trued, said shaft having a flange on its lower end and a bore extending from the top of the shaft and terminating in a lateral extension formed in said flange, a compressed air motor mounted on said flange and having communication with said bore extension through an orifice in said flange, a shaft driven by said motor to rotate about an axis perpendicular the axis of said main shaft, a grinding wheel mounted on said motor-driven shaft, means connecting said main shaft bore with a compressed air supply, and means rotating said main shaft.

11. A device as claimed in claim 10 in which the plane of said grinding wheel is substantially in alignment with the axis of said main shaft.

12. A cutting unit for truing surfaces comprising a casing, a main shaft journalled in said casing for rotation about an axis perpendicular to a surface to be trued and to reciprocate longitudinally of said axis, drive means to rotate said main shaft and means to reciprocate said main shaft, said shaft having a flange on its lower end and a bore extending from the top of said main shaft and terminating in a lateral extension formed in said flange, a compressed air motor mounted on said flange and having communication with said bore extension through an orifice in said flange, a shaft driven by said motor to rotate about an axis perpendicular the axis of said main shaft, a grinding wheel mounted on said motor-driven shaft, and means connecting said main shaft bore with a compressed air supply.

13. A cutting unit for truing surfaces comprising a casing, a vertical shaft journalled in said casing and having a flange at the lower end and a cap secured thereto adjacent the upper end, a ring supported in said casing concentric with said shaft adjacent the upper end thereof, a ball race rolling on said ring, a second ring arranged beneath said cap concentric with said shaft and in rolling contact with said ball race and supporting said cap and shaft from said fixed ring, the surface of one of said rings engaging said ball race having a variation in its surface contour around the ring, spring means urging said shaft and cap in a direction to maintain said rings in contact with said ball race, means for rotating said shaft and cap, and a grinding head mounted on said flange, said grinding head comprising an abrading wheel mounted to rotate about an axis perpendicular the axis of said shaft, and means for rotating said wheel.

14. A device as claimed in claim 13 in which said first-mentioned ring is formed with a surface engaged by said ball race having a contour alternately varying from a peak to a valley around its contoured surface.

15. A device as claimed in claim 13 in which said ring arranged beneath said cap has a chamfered upper surface engaging a chamfered surface at its underside of said cap to provide a centering action.

16. A device as claimed in claim 13 in which the means driving said shaft comprises a worm gear mounted on said shaft, a worm operating through an opening in said casing meshing with said worm gear, a split casing encircling said worm, and a compressed air motor driving said worm.

17. A device as claimed in claim 13 in which the means driving said abrading wheel comprises a compressed air motor, and said shaft is formed with a bore extending from the top thereof and communicating with a bore in said flange in communication with said air motor, the upper end of said shaft having an alternately threaded counterbore, a tube having an enlarged end seated in said counterbore and forming a connection to a compressed air source, a threaded sleeve encircling said tube and threaded into said counterbore, and an expansible member compressed between the end of said sleeve and the enlarged end of said tube to form an air seal between said tube and shaft.

References Cited in the file of this patent

UNITED STATES PATENTS

| Number | Name | Date |
| --- | --- | --- |
| 1,452,113 | Gould | Apr. 17, 1923 |
| 1,889,897 | Johansson | Dec. 6, 1932 |
| 2,070,944 | Hillix | Feb. 16, 1937 |
| 2,321,441 | Webber | June 8, 1943 |
| 2,410,877 | Hall | Nov. 12, 1946 |
| 2,450,157 | Peckett | Sept. 28, 1948 |
| 2,547,087 | Milligan | Apr. 3, 1951 |

FOREIGN PATENTS

| Number | Country | Date |
| --- | --- | --- |
| 158,596 | Switzerland | Feb. 1, 1933 |
| 852,625 | France | Feb. 28, 1940 |
| 913,884 | France | Sept. 23, 1946 |